Patented July 12, 1949

2,475,793

UNITED STATES PATENT OFFICE 2,475,793

PREPARATION OF CHOLINESTERASE

Alex Lesuk, Albany, N. Y., assignor to Sterling Drug Inc., Wilmington, Del., a corporation of Delaware No Drawing. Original application July 24, 1946, Serial No. 685,923. Divided and this application September 27, 1947, Serial No. 776,619

8 Claims. (Cl. 195—66)

This is a division of application Ser. No. 685,923, filed July 24, 1946.

This invention relates to processes for isolating cholinesterase from mammalian erythrocytes in a form suitable for parenteral administration to humans and to its stabilization in dilute solution and in the dry state. It particularly relates to processes for obtaining cholinesterase in water-soluble form from its insoluble complex with the stroma of mammalian erythrocytes.

Cholinesterase is a proteinaceous hydrolytic enzyme of the esterase group. It catalyzes the hydrolysis of choline esters, particularly acetylcholine, to choline and the corresponding acids. It therefore serves to control, by hydrolysis, the action of acetylcholine, a parasympathetic hormone, in the body. There have been recent indications that cholinesterase is of value in alleviating the shock syndrome due to trauma.

It has been known that cholinesterase exists in many of the tissues of mammals. However, practicable processes of isolating this enzyme from natural sources have yet to be reported. It is also been known that most mammalian erythrocytes, which contain true cholinesterase as contrasted to the pseudocholinesterase of the serum, provide a good source for the enzyme. Cholinesterase in the form of an insoluble complex with the stroma of the erythrocytes, may be readily obtained from mammalian erythrocytes. This complex contains about 90% or more of the cholinesterase of the red cells. As the complex represents less than $\frac{1}{10}$ of the weight of these cells, it provides at least a 10-fold concentration of the enzyme. In this form the enzyme is unsuitable for administration and hitherto there has been no method for liberating it from the stroma, the colorless supporting framework of the red blood corpuscle. As used herein, the term stroma is intended to include the supporting framework and other impurities which are carried along with it upon centifugation of acidified hemolyzates of saline-washed erythrocytes.

I have discovered that by incubating at slightly elevated temperatures and at pH 6.5–9.0 the complex of cholinesterase and stroma obtained from thoroughly washed, substantially serum-free erythrocytes, the cholinesterase is liberated in water-soluble form free of particulate matter and is readily separated from the insoluble stroma. The aqueous solution of the enzyme may thereafter be further purified by biochemical methods to remove extraneous protein material.

I have also discovered that cholinesterase in its purified form can be stabilized against denaturation by incorporation of human plasma or serum or of protein hydrolysates containing amino acid mixtures. It is known that in aqueous solutions of low ionic strength purified cholinesterase is inactivated or denatured. Such action results in a product which is not readily soluble in water and is not suitable for administration. I have obviated this difficulty by incorporating human plasma or serum or gelatin or protein hydrolysate with the purified aqueous solution of cholinesterase. This technique provides a preparation of cholinesterase suitable for parenteral administration. If desired the preparation may be desiccated, as for example by sublimation from the frozen state under high vacuum, the resulting product being a fluffy powder, readily soluble in water and stable for long periods of time.

In order that the liberation of cholinesterase in soluble form during incubation may proceed satisfactorily, the erythrocytes must be substantially free of serum. This condition can be attained by thorough washing of the erythrocytes with isotonic salt solution, each washing being followed by effective centrifugation in order to free the erythrocytes from the body of the wash solution. I have found that six such thorough washes, using in each wash a volume of saline solution equal to the volume of erythrocytes, are generally satisfactory. However it is sometimes possible to effect the liberation when the cells are washed only 3 or 4 times.

The inhibitory effect of the serum fraction which may remain with the stroma complex can be counteracted by the addition of egg white to the incubation mixture. If the serum is not completely removed during washing of the erythrocytes, or if it is not effectively removed from the sphere of reaction by the addition of egg white, it exerts an inhibitory action on the reaction. This inhibitory action is evidenced by the fact that the liberation of cholinesterase from the stroma complex takes place at a very slow rate and furthermore the yield of liberated cholinesterase is seriously decreased. The addition of egg white or an extract thereof described herein insures that the rate and amount of liberation of cholinesterase are equal to or greater than those observed where the erythrocytes are thoroughly washed and substantially serum-free.

The factor or factors in egg white which counteract the inhibitory action of serum or plasma are not completely known. The enzyme lysozyme appears to be one of the factors involved, for, the method used in isolating a fraction from egg white which effectively counteracts the inhibitory action of serum, is much like the first part of the procedure of Meyer, et al. (J. Biol. Chem., 113, 303 (1936)) for preparing lysozyme. The drastic conditions observed in this procedure destroy most of the enzymes known to be present in egg white, other than lysozyme and other relatively stable compounds.

I have found that 1 liter of egg white is a suitable amount for the treatment of the stroma fraction complex from about 50 liters of erythrocytes. However, this ratio can be modified within limits without adverse results. For instance, ½ liter of egg white to 50 liters of red cells gives satisfactory results although the liberation of cholinesterase takes place at a slower rate. Similarly, more than 1 liter of egg white per 50 liters of cells can be used, although this is uneconomical and introduces more undesirable proteins which must later be removed.

An extract of egg white can be used in place of egg white with equally efficacious results. It is made by the following method: Egg white is poured into 4–9 volumes of acetone and the mixture is stored at 0° C. for a few hours. The resultant precipitate is dried and powdered. The dry material is extracted with 20 parts of a mixture of 50% aqueous ethanol containing 10% of acetic acid at 60–65° C. for 30 minutes. The hot mixture is filtered and the filtrate is concentrated in vacuo to near-dryness. The residue is taken up in water and neutralized. This extract contains the enzyme lysozyme and certain other egg-white factors. It may be used instead of egg white in my process, the extract of a given volume of egg white being approximately equivalent to that amount of egg white. The use of this partially purified material considerably simplifies the removal from cholinesterase of extraneous protein matter.

During the first 10–36 hours of incubation of the stroma-cholinesterase complex with egg white or the lysozyme-containing extract thereof defined hereinabove, the liberation of cholinesterase proceeds gradually. After about 10–36 hours, however, the yield of liberated or soluble cholinesterase begins to decrease. It is therefore desirable that the incubation be stopped at the point where maximum liberation has occurred. In actual practice there is a period of about 6 hours during which the incubation may be arrested with maximum yield (50–100%) of cholinesterase. The point at which the liberation of cholinesterase is stopped can be determined by an assay method. Assays are made at about 2–3-hour intervals starting at about the eighth or tenth hour of incubation. The incubation is arrested at the point where the consecutive assays indicate that the liberation of soluble cholinesterase has reached its peak value. At this point generally several sets of assays will yield values which are very nearly equal. By stopping the reaction at this stage, a maximum yield is attained.

The assays of cholinesterase are done by the method of Ammon (Pfluger's Arch. f. d. Ges. Physiol., 233, 486 (1933)) as follows: 0.25 ml. of solution to be assayed is placed in the reaction chamber of a Warburg vessel and 2.5 ml. of bicarbonate-Ringer buffer is added. The buffer is prepared by adding 21 ml. of 0.154 M sodium bicarbonate solution to 100 ml. of mammalian Ringer solution and the solution equilibrated for 5 minutes with a mixture of 95% nitrogen and 5% carbon dioxide giving a pH of 7.4. 5 mg. of acetylcholine chloride dissolved in 0.25 ml. of bicarbonate-Ringer solution is placed in the side arm. The vessel is flushed with a mixture of 95% nitrogen and 5% carbon dioxide at 38° C. for 10 minutes before closing the stopcocks and then the acetylcholine in the side arm is added. Readings are taken every 3 minutes for 18 minutes. One unit of cholinesterase is defined as that amount of enzyme which under the above conditions gives 1 cubic millimeter of carbon dioxide per minute during the ensuing 3 to 18 minutes.

The cholinesterase which is bound to the stroma fraction in an insoluble form can be assayed by the above method, just as the liberated or soluble cholinesterase can be determined. When stroma-bound cholinesterase is determined, 5% sodium chloride solution is generally added to peptize the complex and to maintain it in suspension. In order to distinguish between the bound and liberated cholinesterase, the following procedure is used: The suspension to be assayed is adjusted to 25% ammonium sulfate saturation and emulsified with 1–2 drops of toluene per 4 ml. of suspension by manual shaking. The mixture is filtered and the filtrate is assayed by the method given hereinabove. The "stroma-fraction" and its bound cholinesterase is left in the precipitate which is removed by filtration and the liberated cholinesterase is in the filtrate.

The erythrocytes, which comprise the source of the stroma fraction from which I isolate cholinesterase by my invention, may be obtained from most mammals. It is known that the erythrocytes of most mammals contains cholinesterase and my process is applicable to all such cells. In practice bovine or human erythrocytes provide the best source of cholinesterase. Human cells offer the added advantage that hemoglobin impurities or derivatives therefrom are relatively innocuous. Other mammals whose erythrocyte contain cholinesterase include the sheep, horse, ox, cattle, guinea pig, pig, rabbit and goat.

The following example illustrates a typical method of practicing my invention. Certain modifications therein will be apparent to those skilled in the art without departing from the spirit and scope of my invention. The following is given merely as an illustration and in no way limits my invention.

240 lb. of whole beef blood (collected in the presence of an anticoagulant, e. g., sodium citrate) are centrifuged and the erythrocytes thus isolated are washed free of serum with isotonic salt solution (viz., 0.8–0.9% sodium chloride solution) by decantation or centrifugation. Six such washings insure adequate removal of serum, although three efficient washings may suffice, when the volumes of salt solution are approximately equal to that of the red cells. The washed erythrocytes (ca. 50 liters) are hemolyzed by being poured into about 9 volumes of cold distilled water and the pH is adjusted to 5.5–6.0 with N/2 acetic acid. The mixture is stirred for ½ hour, then passed through a homogenizer in order to form a precipitate which packs more readily and occupies much less volume (ca. $\frac{1}{10}$ that of non-homogenized material) and centrifuged. The precipitate is washed with M/100 phosphate buffer at about pH 4.5 until the wash is relatively free of hemoglobin. This precipitate contains the stroma fraction of the erythrocytes and the bound cholinesterase in an insoluble form.

This stroma fraction (4 liters) is stirred or homogenized with 4–5 volumes of cold distilled water and alkali (N/25 sodium hydroxide) is added to pH 8.0–9.0. The dispersion is treated with solid sodium chloride to obtain a concentration of 1–2%, preferably 1.6%. One liter of egg white is added to the dispersion. (When egg white is used the membranes therein are disintegrated by whipping with a spatula and the product is filtered through cheese cloth. It may be suspended in 2–5% sodium chloride solution before addition.) The resultant preparation is diluted with 1–2% sodium chloride solution to bring the total volume to 25 liters.

The diluted suspension is incubated at 37–39° C. for 10–36 hours. The length of time of incubation is taken as the time when 50–100% of the cholinesterase of the "stroma fraction" has been liberated. This is determined by assaying initially the cholinesterase content of this "stroma fraction" which gives the theoretical value of 100% liberation and then making assays at periods of about 3 hours starting at approximately the eighth hour. When the assays indicate that the amount of liberated cholinesterase has reached its maximum value, or in other words, when an equilibrium is reached between the rate of liberation of the material and its rate of destruction, the incubation is stopped.

The incubation is arrested by chilling at the end of the time interval so determined. The mixture is adjusted to 25% ammonium sulfate saturation by the addition of ⅓ volume of cold saturated ammonium sulfate solution. 300 ml. of toluene is added and the mixture is stirred for ½ hour. It is filtered by gravity at 0° C., conveniently being done overnight. The clear filtrate is brought to ⅔ ammonium sulfate saturation by the addition of solid ammonium sulfate or its saturated solution. A precipitate of cholinesterase and hemoglobin is formed. Whenever the hemoglobin precipitate is especially heavy, a volume of cold distilled water is added up to 12% of the volume of the ⅔ saturated ammonium sulfate infusion. This reduces the ammonium sulfate concentration to 58% of saturation and the hemoglobin redissolves in the more dilute solution, while practically all of the cholinesterase remains in the precipitate. The insoluble crude cholinesterase is removed by centrifugation and amounts to about 180 g. of wet material or about 18 g. of dry protein. It is dissolved in 1.8 liters of distilled water and ½ liters of saturated ammonium sulfate is added. The solution is stirred for 10 minutes, stored at 0° C. for at least 2 hours and finally centrifuged for 40 minutes. The resulting supernatant liquid is treated with 2.1 liters of cold saturated ammonium sulfate solution, stirred for 10 minutes, stored at 0° C. for at least 2 hours and centrifuged for 40 minutes. The precipitate (ca. 80 g. wet material or 8 g. dry protein) is taken up in 1 liter of cold 2% sodium chloride solution. To the solution is added Lloyd's reagent in small portions with stirring until the solution is practically, but not completely, colorless (about 200 g. Lloyd's reagent is required). With each addition of Lloyd's reagent 1 M mono-sodium phosphate solution is added to maintain the pH at 5.0. The mixture is stirred for 15 minutes in an ice bath and stored at 0° C. overnight.

The mixture is centrifuged for 30 minutes and to the supernatant liquid is added 1.8 volumes of saturated ammonium sulfate solution. The resulting mixture is stored at 0° C. overnight and then centrifuged for 40 minutes. The precipitate amounts to 1–10 g. wet weight. It is dissolved in the minimum amount of distilled water, the resulting solution containing about 20,000 to 40,000 units of cholinesterase per ml. The solution is dialyzed against 0.9% sodium chloride solution at 0–4° C. for 12–15 hours, and then against distilled water in 1-inch Visking Nojax Cellophane tubes for 3 hours. The mixture is then centrifuged and the supernatant liquid treated with 1/10 its volume of citrated human plasma. The resulting stable solution can be sterilized by known procedures such as passage through a Seitz filter. It may be used as such or taken to dryness by sublimation of the frozen solution under high vacuum. The dry powder so formed is readily soluble in water and stable for extended periods of time.

In the above example 50 liters of human erythrocytes (removed from the citrated blood by centrifugation and thoroughly washed with saline solution) can be used in place of 240 lbs. of beef blood. The liberation of the cholinesterase from the stroma complex and its purification are carried out by the method hereinabove disclosed. Traces of hemoglobin, if present in the final preparation, are innocuous and thereby the purification procedure is simplified.

The procedure given above can be carried out without the addition of egg white. The erythrocytes are washed generally six times with isotonic saline solution to substantially remove the serum, each washing being followed by an efficient centrifugation. The other details of the example are unchanged. Similarly the extract of egg white described herein may be substituted for egg white in the example.

At the start of the autolysis or incubation the pH of the mixture is adjusted to 7.5–9.0. As the reaction proceeds the pH value falls gradually, the final value being in the range of 6.5–7.5.

In the stabilization of the aqueous cholinesterase solution in the above example, the plasma concentration may vary from 5% to 100% of the resulting solution. I have found that about 10% plasma concentration (achieved by adding 1/10 volume of plasma to 1 volume of the cholinesterase solution) is to be preferred, especially prior to desiccation from the frozen state. However experiments show that concentrations of 25%, 50%, 75% and 100% plasma are entirely satisfactory, albeit more costly. Bovine plasma is also suitable for stabilization but the resultant cholinesterase preparation is less suited to human administration. In place of human plasma, human serum can be used with equally satisfactory results. I have also found that other soluble non-toxic proteins may be used as stabilizers. For example, sterile, pyrogen-free gelatin solutions can be used, the concentration of gelatin in the stabilized cholinesterase preparation being in the range of 2–10%. Similarly protein-hydrolysate solutions are suitable for stabilization. For instance, I have found that a 15% solution of acid-hydrolyzed casein prepared for human administration (for example, Parenamine, a product of Winthrop-Stearns Inc.) is effective in stabilizing aqueous cholinesterase solutions when added in a volume equal to ⅕ to ½ that of the cholinesterase solution.

All of these protein-type stabilizers discussed hereinabove are also effective in preventing denaturation of cholinesterase on desiccation. I have found that when cholinesterase is taken to the dry state, as by sublimation of the water from the frozen solution by means of high vacuum, the enzyme is denatured and when later taken up in water to provide a solution for administration, only part of the cholinesterase is soluble. I have further found that the aforesaid protein-type stabilizers prevent such denaturation on drying and that the dry product thus obtained is completely and readily soluble in water and has its original cholinesterase activity.

The age and condition of the stroma fraction containing the cholinesterase considerably affect the length of time required to liberate the cholinesterase and the yield obtained. If the precipitated stroma fraction is freshly prepared, the liberation of cholinesterase may reach its peak in 10-20 hours whereas if the stroma precipitate is 2-3 days old (stored in the cold) this peak may not be reached until after 24-36 hours. In the latter case the peak is never so high as in the former. That is, a lower yield of cholinesterase is obtained from aged stroma. In fact the yield is markedly reduced, and in some cases it is negligible. Similarly lesser amounts of egg white or the extract thereof result in slower liberation of cholinesterase and lower yields in the case of the stroma complex obtained from incompletely washed erythrocytes. In working up the cholinesterase it is therefore necessary to follow by assay the liberation of the enzyme from the insoluble stroma in order that the incubation may be stopped at peak liberation. A practical method for determining this peak is disclosed in detail hereinabove.

The temperature of the incubation of the stroma-cholinesterase complex may vary over a fairly wide range. The preferred range is 30-40° C., although lower temperatures are suitable. Above 50° C. the reaction is inhibited, and below 30° the reaction is too slow to be useful. In practice I prefer to maintain the incubation temperature close to 37° C. and usually in the range of 35-40° C.

In carrying out the processes which comprise this invention it is necessary that enzyme poisons be avoided, since the reaction is primarily an enzymatic one. Among such poisons are the heavy metals and many antiseptics and preservatives. For this reason distilled water should be employed throughout. It is important also that aseptic conditions be maintained insofar as practicable.

I claim:

1. A process for preparing cholinesterase in stable water-soluble form from its insoluble complex with the stroma of mammalian erythrocytes, which comprises incubating said complex in an initially weakly alkaline aqueous medium, removing the insoluble stroma, isolating the cholinesterase from the resulting solution, and stabilizing said cholinesterase by incorporating therewith a parenterally compatible, nontoxic, nonantigenic member of the group consisting of proteins and partially hydrolyzed proteins.

2. A process for preparing cholinesterase in stable water-soluble form from its insoluble complex with stroma of mammalian erythrocytes which comprises incubating the cholinesterase-stroma complex at 35-40° C. in an aqueous medium at pH 6.5-9.0, removing the insoluble stroma, purifying the cholinesterase remaining in the solution by fractionally precipitating it in aqueous solution with a protein-precipitating inorganic salt, dialyzing the precipitated cholesterase in aqueous solution, and stabilizing the purified cholinesterase by incorporating therewith a parenterally compatible, nontoxic, nonantigenic member of the group consisting of proteins and partially hydrolyzed proteins.

3. A process for preparing a desiccated, stable, water-soluble cholinesterase preparation which comprises incubating the insoluble cholinesterase-stroma complex of mammalian erythrocytes at 35-40° C. in 1-2% salt solution at pH of 6.5-9.0 in the presence of egg-white, removing the insoluble stroma, freeing the resulting solution of cholinesterase from objectionable impurities by fractionally precipitating the solution with a protein-precipitating inorganic salt, and thereafter dialyzing the cholinesterase in aqueous solution, incorporating a stabilizing amount of human blood serum with the purified cholinesterase in aqueous solution, freezing said stabilized cholinesterase solution and removing the water therefrom by sublimation in vacuo.

4. In a process for preparing cholinesterase in water-soluble form from its insoluble complex with the stroma of mammalian erythrocytes, the step which comprises incubating said complex in an initially weakly alkaline aqueous medium.

5. In a process for preparing cholinesterase in water-soluble form from its insoluble complex with the stroma of mammalian erythrocytes, the step which comprises incubating the cholinesterase-stroma complex at 35-40° C. in an aqueous medium at pH 6.5-9.0.

6. The step according to claim 5 wherein the incubation is conducted in 1-2% aqueous saline solution.

7. The step according to claim 5 wherein the incubation is conducted in the presence of egg white.

8. The step according to claim 5 wherein the incubation is conducted in the presence of an acetone-precipitable egg white fraction which is soluble in aqueous alcoholic acetic acid and stable to said solvent mixture at 65° C.

ALEX LESUK.

REFERENCES CITED

The following references are of record in the file of this patent:

Richter et al., "Blood Esterases," Biochem. Jr. (1942) 36, pp. 746 to 757.

Stedman et al., Choline Esterase, J. Biochem., (1935) 29, page 2110.